United States Patent [19]

Pedersen

[11] Patent Number: 4,629,216
[45] Date of Patent: Dec. 16, 1986

[54] METHOD OF JOINING PREFABRICATED HEAT INSULATED PIPES AND A WELDING FITTING THEREFORE

[75] Inventor: Hans N. Pedersen, Horsens, Denmark

[73] Assignee: I. C. Moller A/S, Fredericia, Denmark

[21] Appl. No.: 506,869

[22] Filed: Jun. 22, 1983

[30] Foreign Application Priority Data

Jun. 29, 1982 [DK] Denmark ............................ 2911/82

[51] Int. Cl.[4] ............................................. F16L 13/02
[52] U.S. Cl. ...................................... 285/21; 285/419; 285/423; 285/47; 156/273.9; 156/294; 219/544
[58] Field of Search ................. 285/21, 419, 293, 423, 285/47; 219/544, 535; 156/273.9, 294, 305

[56] References Cited

U.S. PATENT DOCUMENTS

| 48,517 | 7/1865 | Chambers | 285/419 |
|---|---|---|---|
| 1,823,974 | 9/1931 | Ferguson | 285/293 |
| 2,739,829 | 3/1956 | Pedlow et al. | 285/21 |
| 2,828,800 | 4/1958 | Hopkins et al. | 285/293 X |
| 2,963,394 | 12/1960 | Wilkinson | 285/21 X |
| 3,022,209 | 2/1962 | Campbell | 285/21 X |
| 3,206,537 | 9/1965 | Steward | 285/21 X |
| 3,229,998 | 1/1966 | Pennington | 285/419 |
| 3,744,823 | 7/1973 | Muir et al. | 285/21 |
| 4,096,017 | 6/1978 | Wyke et al. | 156/273.9 |
| 4,152,577 | 5/1979 | Leavines | 219/535 X |

FOREIGN PATENT DOCUMENTS

| 3005078 | 10/1980 | Fed. Rep. of Germany | 285/21 |
|---|---|---|---|
| 1416207 | 9/1965 | France | 285/21 |

*Primary Examiner*—Thomas F. Callaghan
*Attorney, Agent, or Firm*—Antonelli, Terry & Wands

[57] ABSTRACT

For mounting a protective sleeve of plastic over a joint between prefabricated heat insulated pipes, typically subterranean district heating pipes, an axially split plastic sleeve is inserted laterally over the joint so as to bridge the opposed ends of outer protective plastic tubes of the joined pipes. A plastic welding strip provided with a number of embedded parallel heating wires, is placed along and over the relevant annular joint with its opposed ends located spaced from each other adjacent the axial split of the sleeve. The ends of the strip are provided with terminals for parallel connection of the embedded wires, and the wires are electrically heated to weld together the welding strip and the two plastic tube ends. The axial split is then sealed by a similar welding strip.

8 Claims, 12 Drawing Figures

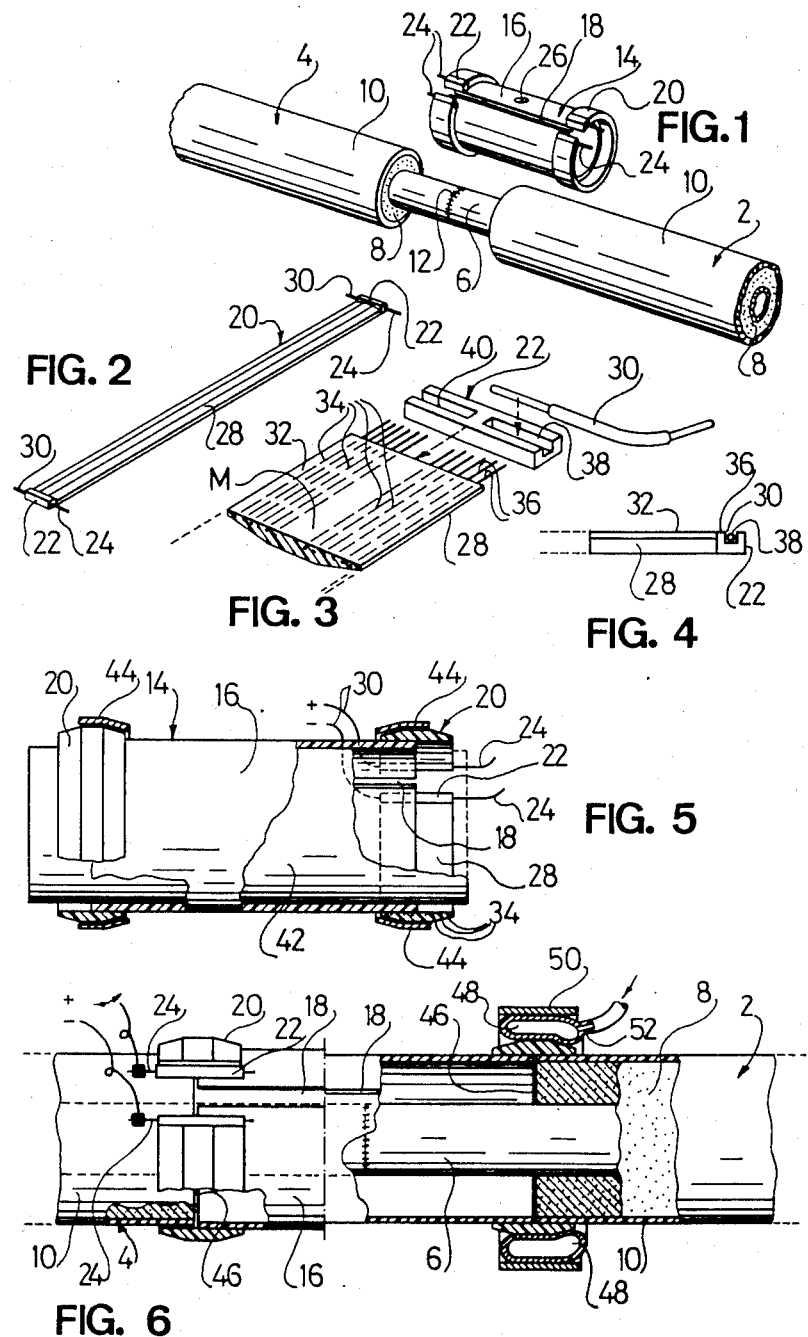

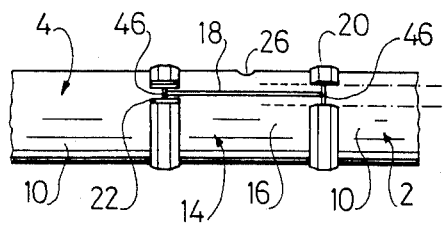
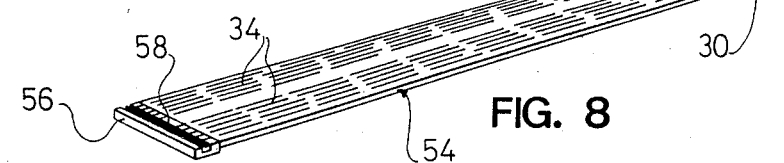
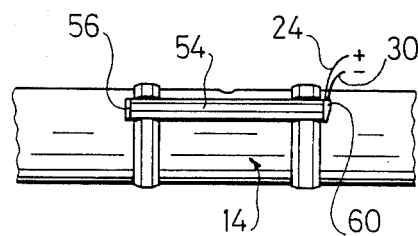
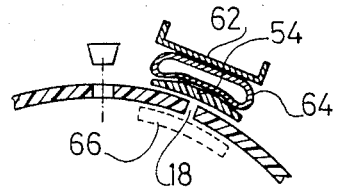
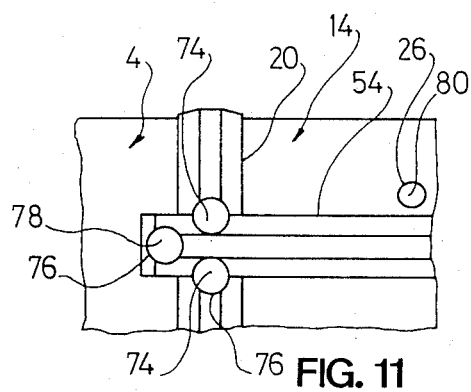
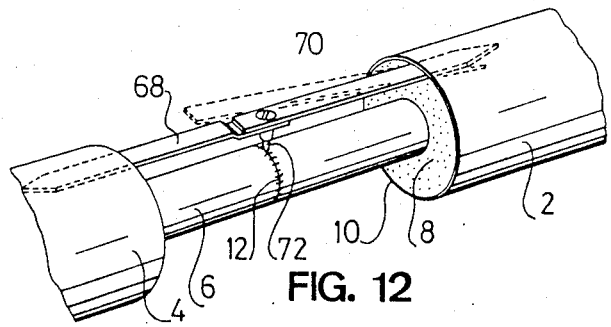

METHOD OF JOINING PREFABRICATED HEAT INSULATED PIPES AND A WELDING FITTING THEREFORE

The present invention relates to heat insulated pipe systems such as subterranean district heating pipe systems and, more particularly, to methods and means for joining prefabricated heat insulated pipes in such systems.

Prefabricated heat insulated pipes of the relevant type include an inner conductor pipe surrounded by a heat insulating material such as rigid polyurethane foam, which is again surrounded by a tubular outer protective plastic mantle. The inner pipe projects from the coinciding ends of the insulation material and the mantle tube, and for joining two consecutive pipes, these projecting inner pipe ends thereof are joined by welding or otherwise, whereafter, the free space about the joined pipe ends is heat insulated and covered by an outer protective sleeve, which is arranged so as to constitute a continuation of the mantle tubes across the joint. In practice it is normally preferred to mount the sleeve and then heat insulate the joint by pouring a foaming-up liquid into the sleeve through an upper hole therein, whereafter the hole is closed, when the foam has filled up the sleeve.

At least for subterranean pipe systems it is imperative that the connection sleeves are joined to the mantle tubes in a fully and durably sealed manner, because water or moisture should be excluded from intrusion into the insulation material, whereby the insulation capacity would be reduced and the conductor pipe subjected to corrosion attacks.

Many attempts have been made to provide for a fully sealed interconnection between the mantle tube ends across a pipe joint, but it has been a problem to provide the connection in a both highly effective and reasonably easy and cheap manner.

An important attempt is disclosed in the European Patent Application No. 80201208.8, which is welded to the mantle tube ends by way of a so-called extrusion welding, which is a very efficient welding method, which, however, requires highly skilled mounting workers. Other important solutions are based on the use of connector sleeves of steel, but the present invention is concentrated on the use of plastic sleeves to be mounted by welding, because the joining by welding is principally an optimal solution with respect to mechanical rigidity and sealing effect.

For the welding of plastic, to plastic several welding methods have already been developed, and one very advantageous method is based on the use of an electrical heating wire embedded in at least one of the parts to be joined, whereby the necessary heating of the surfaces to be welded together is achievable simply by applying an appropriate voltage to the heating wire. It is a specific purpose of the invention to provide a method for taking advantage of this simple welding technique in connection with the mounting of connector sleeves as indicated above.

It is already known in the art to provide for plastic connector tube members which are provided with an embedded heating wire helically extending along the inner surface of the tube members, whereby such a tube member is usable for joining two abutting plastic pipe ends, when the tube member is mounted around and across the butt groove between the pipe ends and is caused to shrink during the welding operation so as to firmly engage the outside of the pipe end portions to be joined. Such a technique, however, is not suited for mounting of a connector sleeve, because the connector sleeve itself is bound to be mountable between two fixed pipe or mantle tube ends, whereby the sleeve to be mounted cannot be a simple tube piece of a diameter corresponding to the diameter of the mantle tubes. It could be premounted a relatively wide tube piece axially slidable on one of the mantle tubes so as to be displaceable into its mounting position across the conductor pipe joint and be shrinkable in this position, e.g. by means of applied heat, to a diameter corresponding to the mantle tube diameter preparatory to being welded by means of the said connector tube members, but such a mounting method would be rather troublesome.

According to another known method the connector sleeve is provided as a sheet of a plastic material which is wrapped around the opposed ends of the mantle tubes so as to bridge the connector pipe joint therebetween, this sheet being provided with a heating wire extending along the edges thereof so as to enable a welding heating of the sheet edge portions as circumferentially engaging the mantle tube ends as well as the axially extending edge portion of the sheet as overlapping the opposed axial edge portion of the wrapped sheet member. Thus, when the sheet is mounted around the joint it will be self-adjusting to the diameter of the mantle tubes, and it can be welded both circumferentially an axially by actuation of the welding wire. However, the sleeve member as hereby formed will be located generally outside of or not flush with the mantle tubes, and besides, a sealing problem will occur adjacent the ends of the overlapping edge portions, where an entirely continuous circumferential welding is difficult to provide.

Another general problem with the known plastic fitting members with embedded welding wire is that they are entirely useless if, for some reason, the welding wire is damaged somewhere. This naturally leads to a desire of using a thick wire, which is embedded safely in the material, but both of these precautions are in disfavour of a high quality welding result.

It is the object of the invention to provide an advantageous joining technique for the discussed purpose, based on the use of the embedded welding wire principle.

According to the invention the connector sleeve constituted by an axially split piece of plastic pipe is joined welding to each of the mantle tube ends by a plastic welding strip with embedded electrical heating wires, with each strip being laid against the outside of the sleeve end, and the respective mantle tube end along the annular joint therebetween with the free strip ends located, mutually spaced, adjacent the axial split, whereafter the heating wires are actuated for on-welding the strip across the annular joint, and then a sealing is effected of both the axial split and the part of the annular joint as remaining between the strip ends.

Thus, the connector sleeve is mountable between and flush with the mantle tubes irrespective of diameter deviations within reasonable tolerances, and the welding fittings, constituted by the strips, are easily mountable about the circumferential joints, likewise irrespective of the tolerances and without having to be shrinked and without, in the first place, causing any sealing problems due to overlapping, because the strip ends do not overlap each other. On the other hand, of course, they leave a portion of the joint uncovered between their adjacent ends, but such an unsealed portion may be effectively sealed afterwards, by any suitable method, without the sealing problem as caused by overlapping portions. Also the entire axial split in the connector sleeve may be sealed afterwards by any suitable technique such as extrusion welding. A preferred technique as closely related to the main invention is described below.

The invention is based on the use of the welding strips, which are, themselves, a novel concept in plastic welding fittings. As further specified below they may be produced in an inexpensive manner by extrusion, whereby the heating wires easily incorporated into the strips, when they are caused to be co-extruded so as to be present as straight and parallel wires in the strip material. Obviously, such a production will be much easier than the production of the known connector pipe members as provided with an embedded wire coil, not to speak of a wrapping sheet as provided with an embedded wire extending along three edges thereof.

Thus, it is a characteristic feature of the welding strip material, as produced by simple extrusion that it may contain a plurality of parallel heating wires, which can be located with a desired mutual spacing and very close to or practically immediately in the active surface of the strip material. Hereby the welding strips as cut from the extruded material may show several special features and advantages:

(1) The strips may be provided with opposed end terminal units, in which the ends of the parallel heating wires are interconnected, all or groupwise, so as to be electrically operable in parallel.

(2) When operated in parallel the single wires in any group of juxtaposed wires may be relatively thin, because an accidental break of a wire will not make the entire wire system inoperative, i.e. all the wires may be relatively thin.

(3) The parallel wires may be placed with such small mutual spacing that the general heating and welding effect of the wires on the active surface area of the welding strip will not be detrimentally affected, should one or a few of the thin wires happen to be inoperative.

(4) The wires, due to their acceptable thinness, may be mounted extremely close to or in the active surface of the strip, whereby the welding action of the applied energy is optimized and maximized.

(5) By means of the strip end terminals, the wires may be connected electrically in a selective manner, e.g. for parallel connection of either all the wires or the wire groups as located along one and the other half of the strip, respectively, whereby the strip will be selectively weldable to one part or the other of the parts as bridged by the welding strip. Another possibility is that the terminal at one end of the strip provides for an interconnection of all the wires, while in the opposite terminal the wire groups as belonging to the respective opposed halves of the strip are connected to separate connector wires, whereby the two wire groups will be operable in series as current supplied from a single end of the strip.

(6) For a circumferential welding a welding strip, is used the length of which is chosen so as to be slightly smaller than the circumferential length of the joint, and the welding current or voltage is adjusted simply according to the length of the welding strip. Thus, the same type of strip or "welding fitting" is usable for the joining of pipe ends completely irrespective of the common diameter thereof, and instead of providing for different welding fittings with embedded wires for different diameters, it will be sufficient to cut off the required strip lengths from an extruded strip material and adjust the welding current supply accordingly, which is, in practice, very simple indeed.

It is of special importance that a welding strip according to this aspect of the invention will be perfectly suitable for the sealing of the axial split of the sleeve member simply by placing the strip over and along the split and actuating the welding wires. The same strip member will be usable even for sealing the remaining portion of the circumferential joints, when or as these portions are located adjacent the axial split, since the ends of the applied annular welding strips may be cut to define such a distance between them as corresponding to the width of the axial welding strip. The latter will then automatically seal the remaining portions of the annular joints in addition to the sealing of the axial split.

In practice, it is possible to make use of certain standard lengths of the welding strip, i.e. the said terminal members are premountable under factory conditions. As even the length or lengths of the connector sleeves may be standardized, it is an advantageous possibility to premount the annular welding strips on the sleeve members, along end edges thereof and protruding therefrom, whereby the mounting work in the field is highly facilitated, all as explained in more detail below.

The invention also comprises the special welding fittings as constituted by the welding strips with or without an associated sleeve member.

In the following, the invention is described in more detail with reference to the drawing, in which:

FIG. 1 is a perspective view illustrating a pipe joint,

FIGS. 2 and 3 are perspective views of a welding strip and a detail thereof, respectively, FIG. 4 is a side view of one end of the welding strip, FIG. 5 is a side view, partly in section, of a sleeve member as being provided with welding strips, FIG. 6 is a similar view of the sleeve member as being mounted over a pipe joint, FIG. 7 is a side view of the pipe joint provided with the sleeve, FIG. 8 is a perspective view of a welding strip for sealing an axial split in the sleeve, FIG. 9 is a side view similar to FIG. 7, but now provided with the split sealing strip of FIG. 8, FIG. 10 is a sectional view illustrating the fixing of the sealing strip of FIG. 8, FIG. 11 is a plan view illustrating a welding strip crossing, and FIG. 12 is a perspective view showing a mounting aid for the sealing strip as fixed according to FIG. 10.

In FIG. 1 is shown the ends of two heat insulated pipes 2 and 4 to be joined. Each pipe comprises an inner iron pipe 6 with a surrounding layer of an insulation material 8 and an outer protective mantle tube 10 of plastic such as PEH. The ends of the iron pipes 6 project from the coinciding ends of the parts 8 and 10, and the iron pipe ends are shown as already joined along a weld seam 12. Thereafter a sleeve member 14 should be mounted over the joint so as to bridge or continue the ends of the mantle tubes 10 in a rigid and moisture tight manner.

The sleeve member 14 comprises a cylindrical plastic tube piece 16 having an axial split 18 and at both ends being provided with a plastic collar strip 20, which is mounted against the outside of the tube 16 so as to project axially therefrom. The strips 20 are open adjacent the axial split 18 and are here provided with terminal members 22, from which electrical wires 24 project. Briefly, for mounting the sleeve member 14 the tube 16 is opened along the split so as to be laterally introduceable over the pipe joint, whereafter, as more fully explained below, the collar strips 20 are welded to the respective ends of the mantle tubes 10 by connecting the wires 24 to an electric welding generator. The sleeve member 14 has a top hole 26 to be used for a later filling in of heat insulation material into the mounted sleeve.

One of the collar strips or welding strips 20 is shown in FIG. 2 prior to being mounted on the sleeve tube 16. It consists of a strip portion 28 as cut from an extrusion and endwise provided with the said terminals 22. These are plastic members, which are fixed to the strip ends by any suitable welding method. Both terminal members 22 have the wire 24 projecting to one side and another wire 30 projecting to the opposite side.

One end of the welding strip is shown from the opposite side and in more detail in FIG. 3. The extruded strip portion 28 has a substantially flat active side 32, in which is embedded a number of parallel, thin copper wires 34, which are located very close to or almost in the surface of the side 32. It is deemed unnecessary to describe the production of the strip 28 in more detail, as it will be clear to those skilled in the art that the strip is easy to extrude together with the parallel wires 34. The wires 34 are absent from the middle area M of the strip, whereby the wires are clearly separated in two opposed groups, viz. a right and a left group. The cross section of the opposite side of the flat strip is slightly convex.

The strip member 28 is cut off from a strip extrusion, whereby also the wires 34 are cut. Thereafter, the opposite end portions of the plastic material are removed so as to leave exposed wire ends 36 projecting from the plastic strip ends. Then the terminal members 22 are welded to the strip ends such that the wire ends 36 project over the terminal members. These are provided with transverse grooves 38 and 40 as adapted for receiving the relevant ends of the connector wires 30 and 24, respectively. The thin wire ends 36 are soldered to these respective connector wires, whereby the wire 30 of FIG. 3 will be connected with all wires 34 in the "right" group of wires 34, while the groove 40 will receive a wire 24 as connected with all wires 34 in the "left" group thereof. The result will be as shown in FIG. 4.

For premounting the collar or welding strips 20 on the split tube 16 it is sufficient to introduce the tube 16 onto a mandrel 42, as shown in FIG. 5, and lay the strips about the tube ends and arrange for suitable clamps 44 to force the respective halves of the strips against the outside of the tube 16. Thereafter, the connector wires 30 of each strip are connected with a current source operable to cause a suitable heating current to pass through all the wires 34 of the strip half as engaging the tube 16, whereby a high quality welding of the strip to the tube surface is achievable. The resulting sleeve member 14 (FIG. 1) is delivered from the factory as a welding fitting for use in the field. The connector wires 30 may be cut off, as they have now served their purpose, and the sleeve member 14 of FIG. 1 is correspondingly shown as having connector wires 24 only.

It will be readily understood that the connector wires 24 should be used for correspondingly effecting a welding of the strips 20 to the ends of the mantle tubes 10 once the sleeve has been inserted over the pipe joint. In its loosely inserted position, as illustrated to the left in FIG. 6, the sleeve will show a relatively broad axial split 18, and the active side of the welding strip will not generally engage the outside of the mantle tube 10, as the diameter of the sleeve tube 16 will be somewhat bigger than that of the mantle tubes 10. The sleeve tube 16, however, will be located generally between the ends of the mantle tubes 10, forming a narrow joint or groove 46 therewith.

In order to now weld the protruding strip halves to the mantle tube ends it is sufficient to force the strips 20 against the outside of the mantle tube ends and supply the necessary current to the connector wires 24 from a welding generator in the field. In the right hand side of FIG. 6 is illustrated a simple and advantageous manner of applying the necessary mechanical pressure to the strip 20, viz. by way of an inflatable hose 48 as laid about the strip 20 and supported outwardly against a surrounding rigid ring member 50. The hose 48, when inflated, through a stub 52, will then serve to force the projecting half of the strip 20 against the respective mantle tube 10 all the way around, whereby the split 18 is narrowed and the sleeve tube 16 is centered flush with the ends of the mantle tubes 10. Then the projecting half of the welding strip is effectively welded to the respective mantle tube when the welding wires 34 are actuated through the connector wires 24.

The result will be as shown in FIG. 7, primarily in the left hand side thereof. The axial split 18 will be quite narrow, the sleeve tube 16 will be located generally flush with the mantle tubes 10, and a short length of the annular joint groove 46 will be exposed between the opposed ends of each of the welding strips 20.

Thereafter, as illustrated in the right hand side of FIG. 7, the ends of the strips 20 are cut off so as to leave between them a free space of a predetermined length or width a. Hereafter the axial split 18 is covered and sealed by means of a welding strip 54 (FIGS. 8 and 9), which corresponds at least principally to the strips 20 (FIG. 2), while preferably the strip 54 is simply made from the same extrusion as are the strips 20. It is important, anyway, that the dimension a (FIG. 7) is equal to the width of the strip 54 (FIGS. 8-9), such that the strip 54 will be operable to cover and seal not only the axial split 18, but additionally the joint portions 46 as left between the opposed ends of the strip 20.

By the cutting away of the ends of the strips 20 also the terminal members 22 are removed. These members 22 have not been welded to the tube surfaces, so by the cutting it is ensured that the strip fitting 20 as effectively left on the joint is safely welded along its entire length.

As shown in FIG. 9 the straight welding strip 54 is now placed along the split 18 so as to extend, at both ends, just beyond the cross gaps between the ends of the annular strips 20, and then the welding wires of the strip 54 are actuated for the fixing of the strip.

The terminal members of the strip 54 are preferably designed as shown in both FIGS. 8 and 9. One terminal member 56 has a continuous groove, in which a connector wire 58 is arranged so as to interconnect all of the welding wires 34 of both halves of the strip. The other terminal member, designated 60, is designed with two grooves for receiving the connector wires 24 and 30, though here the grooves are open to the same side for monolateral connection to the current source. It would be perfectly possible to use a welding strip according to the design of FIG. 2, but the FIG. 8 design is advantageous for the following reason.

In practice the length of the sleeve member is normally smaller than the circumferential length of the sleeve, and is approximately only half that length. In the embodiment of FIG. 2 the two groups of wires 34 are individually connectable with a current source, the voltage of which should be adapted to the length of each or a single wire group, as the two groups are not acutuated at the same time. In the strip 54, however, all wires 34 of both wire groups should preferably be actuated simultaneously, which would require a special voltage adaption. When now in FIGS. 8 and 9 the two wire groups are interconnected in series through the connector wire 58 and the length of each group is about half the length of the wire groups of FIGS. 2 and 3, then the effective wire group length will be approximately the same in the two cases, and the welding generator as used in the field for the welding of the strips 20 and the strip 54, respectively, will hereby be able to operate without or with only small voltage adjustments.

For a correct welding of the welding strips, as in FIGS. 5 and 6, it is necessary to apply a welding pressure, and the same is true for the strip 54, FIGS. 9 and 10. As shown in FIG. 10 a rigid beam 62 may be arranged overhead the split 18, endwise supported by any suitable connector system as clamped to the pipes 2 and 4, such that an inflatable hose 64 may be arranged in the space between the strip 54 and the beam 62 for enabling the necessary welding pressure to be applied to the strip 54.

For ensuring a correct welding of the strip it will normally be necessary to provide for some counter pressure means located along the inside of the split area 18, as indicated by dotted lines at 66 in FIG. 10. In practice the arrangement can be as shown in FIG. 12, where two beam portions 68 and 70 are shown forced endwise into the insulation material 8 of the respective pipes 2 and 4 just inside the mantle tubes 10 thereof, whereafter the beams are joined by a screw 72, which radially abuts the iron pipe 6. Several such abutments may be arranged along the beams to provide for a rigid support of the counter pressure beam 68,70.

It should be mentioned that a similar counter pressure problem does not exist as far as the annular strips 20 are concerned, when these are mounted as described above. By the premounting of the strips 20 on the sleeve tube 16, FIG. 5, the mandrel 42 provides for the necessary counter pressure, and when the sleeve 14 is mounted in the field, see the right hand side of FIG. 6, the annular welding area will be rigidly backed or supported by the rigid insulation foam material 8.

On the other hand, should it be desirable to effect the entire mounting of the annular strips 20 in the field, by welding the strips stepwise of in one operation to both sides of the joint 46, then it will normally be necessary to arrange for a support ring member just inside the ends of the sleeve tube 16. Preferably the ring members should be axially stuck into the mantle tube ends so as to follow the insides thereof for correct centering of the sleeve tube 16. It would even be possible to use a ring member having a V-shaped cross section, whereby the adjacent ends of the sleeve tube and the mantle tube could be deformed conically to provide for a countersunk mounting of the entire welding strip.

After the mounting of the axial strip 54 the wires 24 and 30 are cut off, and the joints between the strips 20 and 54 are sealed by conical stoppers 74, FIG. 11, as welded into afterdrilled holes 76 through the joined material parts, all by a technique as disclosed in the PCT-publication No. WO 83/00115. A further stopper 78 is mounted so as to bridge the non-welded middle portion M (FIG. 3) of the strip 54. By the welding in of these stoppers a complete sealing of and between the welding strips and therewith of the split and joints 18,46 will be achieved.

A further stopper 80 is mounted in the top hole 26 upon foaming liquid having been poured into the mounted sleeve and having produced the desired foam filling of the sleeve, also according to WO 83/00115.

As apparent from FIG. 10 the active side of the welding strip 54 is preferably of a slightly concave cross section so as to at least approximately follow the curvature of the tube periphery. The active side of the annular welding strips 20 should normally be flat cross section, but it is a lucky coincidence that a strip material as extruded with the convexconcave shape according to 54, FIG. 10, automatically tends to assume a convex-flat shape (FIG. 5) when it is bent as relevant to the strips 20 of FIGS. 1, 2 and 5. Even in this respect, therefore, the strips 20 and 54 may well be based on the same strip extrusion.

It should be mentioned as a possible alternative that the welding strips are manufactured without the heating wires, while these are separately embedded in a thin and flat extruded strip, which is laid together with the welding strips prior to the mounting thereof.

Alternatively, the welding strip material may be produced by extruding the plastic strip and later on, in a separate operation, moving the strip through a station, in which the wires are continuously laid against the relevant strip side and embedded therein by means of a heated multiple ridging plough, which causes the plastic adjacent the single wires to be hoed about the wires, preferably so as to entirely cover the wires, though with a very thin top cover lager. The separate operation may be effected even on a row of already cut off strip members, and it is possible, then, to arrange for metallic filler members between the consecutive strip members, whereby, when the filler members are removed after the operation, the wires will extend over a corresponding distance through the air. The wires as cut midways in this air gap will then be ready for connection with the terminal members without any strip end portion having to be removed.

Another manner of exposing the wires will be to simply draw up the wire ends from the material, if necessary during moderate heating of the strip surface, and then cut off the strip end portion, from which the wires have been drawn away.

I claim:

1. A method of joining prefabricated heat insulated pipes having an inner conductor pipe and an outer plastic mantle tube, particularly subterranean district heating pipes, the method comprising the steps of joining ends of the conductor pipes protruding from respective ends of the mantle tube, connecting the mantle tubes by an axially slit plastic connector sleeve the respective ends of the mantle tubes substantially flush therewith, providing a plastic welding strip with embedded electrical heating wires, laying each welding strip against an outside of the sleeve end and the respective mantle tube end along an annular joint therebetween with free ends of the welding strip being located mutually spaced and adjacent the axial split, actuating the heating wires for welding the welding strip across the annular joint, and effecting a sealing across both the axial split and a portion of the annular joint remaining between the ends of the welding strips.

2. A method according to claim 1, wherein both ends of the connector sleeve are provided with end wires projecting welding strips, with opposite ends being provided with electrical terminal members just inside the respective split forming edges of the sleeve wall, the method further comprising the steps of cutting away the terminal members and outer strip ends after the welding step for providing a predetermined spacing between the strip ends corresponding to a width of a separate, but corresponding welding strip thereafter mounted against and welded to an outside of the sleeve over and along the split area and beyond both ends of the split area adjacent the cut strip ends.

3. A method according to claim 2, further comprising the steps of, prior to a mounting of the connecting sleeve, preparing a mounting area for a later welding of the separate welding strip including arranging just inside the mounting area an axially oriented counter pressure beam, and wherein the step of arranging includes bringing an outside of the pressure beam flush with insides of the opposed mantle tubes, with the use of at least one support member for radially engaging the conductor pipe.

4. A welding fitting comprising a plastic member having embedded electrical heating wires, said plastic member being formed as an extruded flat strip with a plurality of longitudinally extending parallel heating wires embedded in the strip material closely adjacent an active side of the flat strip, a terminal member provided on respective ends of the strip in which the ends of at least some of the heating wires are connected with external connector wires.

5. A fitting according to claim 4, wherein the heating wires are thin copper wires of a diameter in a range of about 0.2–0.3 mm and are located substantially at a surface of the flat strip with a mutual spacing in a range of about 2–3 mm over a strip width of about 8 cm with a wireless center area having a width of 1–2 cm.

6. A fitting according to claim 4, wherein the active side of the flat welding strip has a slightly concavely arched cross sectional configuration, and an opposite side of the flat welding strip has a convex cross-sectional configuration.

7. A fitting according to claim 4, wherein an axially split sleeve member is provided, means are provided for rigidly connecting the flat strip with the axially split sleeve member over a partial width thereof and in a partly circumferential position on the sleeve member, to an outside of an end portion of the sleeve member such that the flat strip, over a remaining partial width thereof projects from the end of the sleeve member outside an axial split area thereof.

8. A fitting according to claim 4, wherein the terminal member at one end of the flat strip includes separate connector wires for the heating wires along respective halves of the flat strip, and wherein a short circuit connection is provided between the connector wires provided on the respective halves of the flat strip.

* * * * *